A. J. GRIGGS.

WHIFFLETREE-HOOK.

No. 7,043. Reissued April 11, 1876.

WITNESSES

J. A. Faulenschmidt

Charles Thurman

INVENTOR

Andrew J. Griggs by Geo. W. Dyer & Co.

ATTORNEYS

N. PETERS, PHOTO-LITHOGRAPHER, WASHINGTON, D. C.

UNITED STATES PATENT OFFICE.

ANDREW J. GRIGGS, OF CHICAGO, ILLINOIS.

IMPROVEMENT IN WHIFFLETREE-HOOKS.

Specification forming part of Letters Patent No. 115,307 dated May 30, 1871; reissue No. 7,043, dated April 11, 1876; application filed January 19, 1875.

*To all whom it may concern:*

Be it known that I, ANDREW J. GRIGGS, formerly of Pittsburg, in the county of Allegheny and State of Pennsylvania, and now residing at Chicago, in the county of Cook and State of Illinois, have invented a new and useful Improvement in Trace-Fastener; and I do hereby declare that the following is a full, clear, and exact description thereof, reference being had to the accompanying drawing, and to the letters of reference marked thereon.

The nature of my invention consists in providing the whiffletree of a vehicle with a trace-fastener, constructed in manner hereinafter described.

Figure 1:
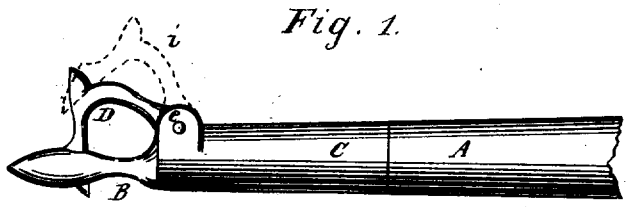
Figure 2:
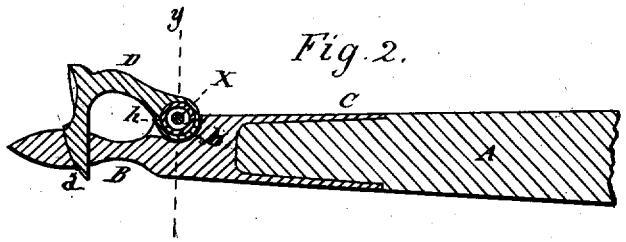
Figure 3:
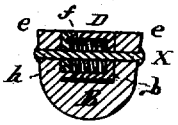

In the accompanying drawing, which forms part of my specification, Figure 1 represents a side view of my improvement in trace-fastener. Fig. 2 is a longitudinal section of the same. Fig. 3 is a transverse section of the same when cut through at line *y* of Fig. 2.

To enable others to make and use my invention, I will proceed to describe more fully its construction and operation.

A represents a part of the whiffletree, of the common form, having secured to its end a casting, C. This casting is formed in the usual manner, with a socket to slip over the end of the whiffletree, and a trace-hook, B, provided with a hole, *a*, to receive the end of the spring-hook, to be hereinafter described.

The casting C is formed with a chamber, *b*, in its upper part, which chamber is cast to a depth of nearly half the width of the said casting, and necessitates the making of the casting large enough so that the socket in its end and the chamber *b* will not be so near each other as to weaken the casting.

The chamber is made in the form of a half circle, and smooth on its interior surface. Its sides *e* are cast to extend a very little way above the upper surface of the casting C, and the chamber *b* can be made deep enough to allow of the sides *e* being cast with their tops on a level with the upper surface of said casting.

In the chamber *b*, between its sides *e*, is pivoted the end of a hook, D, by the pintle X. The end of the hook D that enters the chamber *b* is made in the form of a cylinder, so as to enter and freely turn in said chamber. This end of the hook D is also made hollow and forms a chamber for a spiral spring, *h* which is spirally coiled around the pintle X and has one end secured to the hook D and the other to a disk, *f*.

By the hereinbefore-described arrangement of the pintle X, spiral spring *h*, disk *f*, combined with the hook D, a spiral action is imparted to the hook D. The hook D, having a cylindrical hollow end, and the chamber *b*, adapted to receive the end of the hook, a neat appearance is given to the casting, and the spiral spring entirely protected from the dust and dirt.

The operation of securing the trace of the harness on the hook B is as follows: The hock D is raised up, as indicated by the dotted lines *i* in Fig. 1. The harness-trace is then put on the hook B in the usual manner. The hook D is then allowed to drop back, as shown in Figs. 1 and 2, and thereby holds the harness-trace securely on the hook B, the advantage of which is very apparent.

What I claim is—

1. The combination of the trace-hook B and hook D, with recess in its back end to inclose spiral spring *h*, substantially as described and shown.

2. The trace-fastener described, consisting of the casting C, having the hook B and cylindrical chamber *b*, the hook D, having a cylindrical end, pintle X, sides *e*, and spiral spring *h*, substantially as described and shown.

ANDREW J. GRIGGS.

Witnesses:

WM. H. LOTZ,

HERMAN A. KROESCHELL.